Sept. 20, 1971 KICHIRO SATOH 3,605,800
AUTOMATIC REGULATING VALVE
Filed Oct. 20, 1969 2 Sheets-Sheet 1

INVENTOR
Kichiro Satoh
Holman Glascock
BY Downing & Seebold
ATTORNEYS

Sept. 20, 1971  KICHIRO SATOH  3,605,800
AUTOMATIC REGULATING VALVE

Filed Oct. 20, 1969  2 Sheets-Sheet 2

INVENTOR
KICHIRO SATOH
BY Holman, Glascock,
Downing & Seebold
ATTORNEYS 3,605,800
AUTOMATIC REGULATING VALVE
Kichiro Satoh, 29 Uguisudani-machi, Shibuya-ku,
Tokyo, Japan
Filed Oct. 20, 1969, Ser. No. 867,443
Int. Cl. F16k *31/12*
U.S. Cl. 137—505.18                    1 Claim

ABSTRACT OF THE DISCLOSURE

An automatic regulating valve to assure the constant flow and the constant pressure on the secondary side regardless of any changes of the pressure on the first side, in which a valve body is provided with a neck portion defining upper and lower surfaces receiving the same pressure and an adjusting means acts on the valve body and maintains the predetermined pressure.

BACKGROUND OF THE INVENTION

For the transmission of high pressure fluid, a reliable and safe valve is required. However, any conventional electric or pneumatic regulating valves for such purpose are disadvantageous in that such valves lose the function of a regulating valve in case the pressure on the first side fluctuates. This is a result of the mechanism of the conventional valves in which the pressure on the secondary side is affected whenever the pressure on the first side changes. Such a valve is unreliable and dangerous from the explosion view point.

This invention is to eliminate such disadvantage by means of improving the structure and the mechanism so that any pressure once set on the secondary side may be kept entirely free from any changes of the pressure on the first side.

SUMMARY OF THE INVENTION

The present invention provides an automatic regulating valve for the high pressure fluid, which assures the constant flow and the constant pressure to the secondary side from the first side.

Supposing that any user desires to fill a tank with any fluid up to the limit of 10 atmospheric pressure, according to the present invention, the fluid flows continuously into the tank until the pressure in the tank reaches 10 atmospheric pressure and at this moment, the feeding of the fluid is automatically stopped, and if any quantity of the fluid is removed from the tank and the inner pressure reduces, the feeding is automatically resumed immediately.

One object of the present invention provides a novel and improved automatic regulating valve which can effectively eliminate the disadvantages inherent in the conventional automatic regulating valves.

Another object of the present invention provides a novel and improved automatic regulating valve which can keep any predetermined pressure on the secondary side in spite of any change of the pressure on the first side.

According to the present invention, there is provided an automatic regulating valve comprising a valve casing having an inlet and outlet, a valve opening in the casing, a valve body housed closely in the opening and having a neck portion at the circumference thereof opposite to the inlet and forming an upper surface and a lower surface which receive the same pressure respectively, a first free chamber receiving the flow from the inlet and disposed in the upper side of the opening, a second free chamber passing the flow to the outlet and disposed in the lower side of the opening, a pressure receiving plate on the lower end of said valve body and housed closely in the second chamber, a passage connecting the first and second chambers, and a spring-loaded adjustable screw means connected to the lower surface of the pressure receiving plate.

These and other objects and features of this invention will be better understood by the following detailed description and the accompanying drawings.

BRIEF DESCRIPTION OF THE DRAWINGS

The accompanying drawings show one preferred form of automatic regulating valve to assure a constant flow and a constant pressure constructed in accordance with the present invention for illustrative purposes only, but not for limiting the scope of the invention in which.

DESCRIPTION OF A PREFERRED EMBODIMENT

Figure 3:
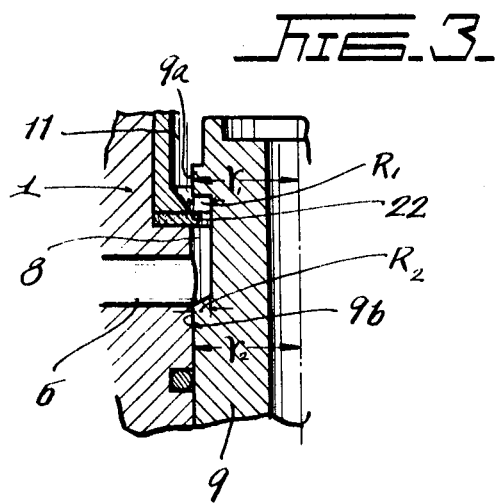
FIG. 3 is a fragmentary sectional view illustrating a part of the valve on an enlarged scale.

The automatic regulating valve generally comprises a valve casing 1 adapted to be arranged on a transmittal tube for the fluid. An inlet 2 and an outlet 3 are arranged in both sides of the casing and each is connected to a pressure gauge (not shown). A vertical opening 4 is formed in the center of the valve casing and a horizontal opening 5 is disposed under the opening 4 and serves as intermediate passage to the outlet side. An inlet passage is disposed between the inlet 2 and the vertical opening 4 and an outlet passage 7 between the outlet 3 and the intermedate passage 5. The vertical opening houses closely a valve body 9 having a neck portion 8 forming a first pressure chamber. A spring 21 is loosely mounted at the upper end of the valve body 9 and is pushed down by a cap 10 which is threaded into the valve casing 1, thereby closing the vertical opening. As seen in FIG. 3, it is necessary that diameter $r_1$ of a upper portion 9a and diameter $r_2$ of a lower portion 9b of the valve body 9 must be exactly equal in size and that the circumferential area $R_1$ covered by the bottom surface of the upper portion 9a and the area $R_2$ covered by the top surface of the lower portion 9b of the valve body 9 must also be exactly equal. A packing 22 is disposed at the lower end of the cap 10 and is capable of being pushed by the upper portion 9a to shut off the pressure fluid in the inlet 2. A stepped portion 11 is formed within the inner surface of the lower end of the cap 10 and when such portion 11 slides and connects to the neck portion 8, the fluid can flow inwardly. A pressure receiving plate 12 is closely housed within the intermediate chamber 5 and secured to the lower end of the valve body 9. A vertical passage 13 is formed in the center of the valve body 9 and a horizontal passage 14 on the plate 12 is connected to the vertical passage 13. A first free chamber A is formed above the top of the valve body 9 and a second free chamber B above the pressure receiving plate 12 by a stopper 15 located at the bottom of the casing 1 blocking the intermediate pasasge 5. The two free chambers are connected through the vertical passage 13 and horizontal passage 14.

A cylindrical body 16 having a coil spring 17 is secured to the center of the stopper 15. At the one end of the spring 17, a first pusher 18 is mounted and makes contact with the plate 12, while at the other end a second pusher 19 makes contact with a bottom surface 16a of the body 16. An adjusting screw 20 having a manipulating handle 23 is threaded into the center of the bottom surface 16a. One end of the adjusting screw contacts the pusher 19 whereby the pressure to the plate 12 and the valve body 9 is adjusted by the manipulation of the adjusting screw and the pressure of the fluid flowing from the outlet to the second side is desirably established.

Figure 1:
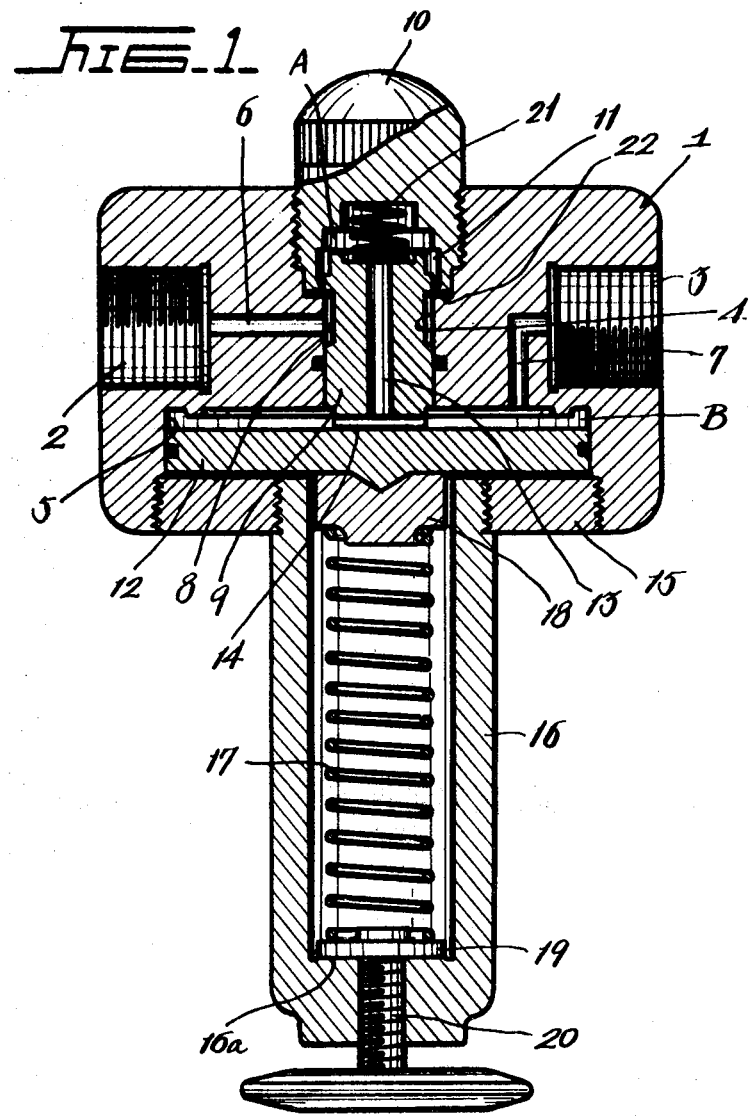
FIG. 1 is a vertical sectional view of the valve illustrating the valve in a closed position.
Figure 2:
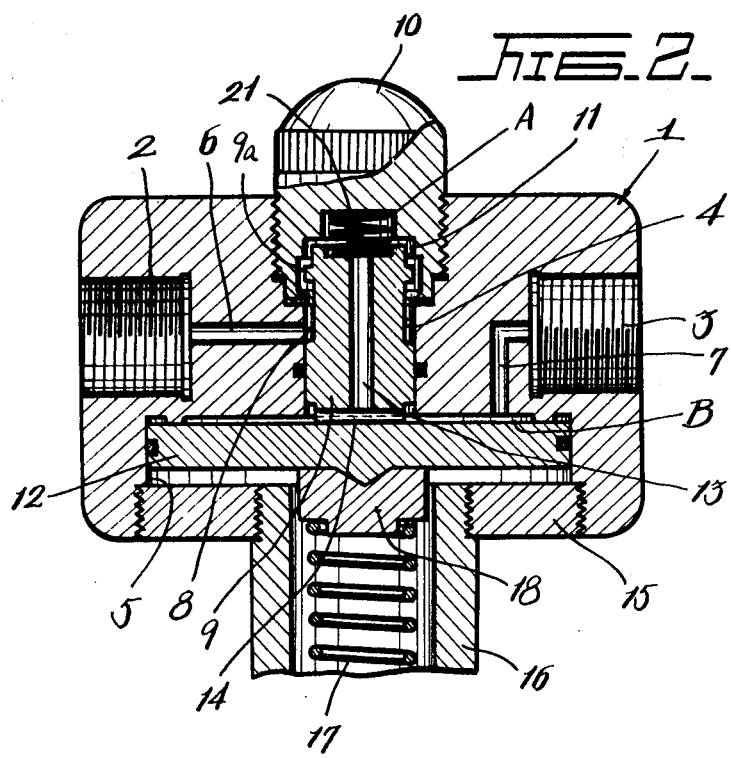
FIG. 2 is a vertical sectional view of the valve illustrating the valve in an opened position.

The operation of the device of the present invention is as follows:

The handle 23 is manipulated so that the adjusting screw 20 does not compress the spring 17 as seen in FIG. 1. In that state, the valve body 9 is pushed down by the action of the spring 21 and the upper portion 9a contacts the packing 22 and stop the flow of the first pressure fluid in the inlet 2. In this condition, if the user desires to place the fluid into the secondary side (such as a tank) by the desired pressure, the handle 23 is turned so that the adjusting screw 20 causes the spring 17 to compress. Then, the pressure receiving plate 12 and the valve body 9 are pushed upward and as the upper portion 9a moves upwardly, the high pressure fluid at the inlet 2 starts to flow into the first free chamber A. The fluid thereafter flows to the second free chamber B via the vertical passage 13 and horizontal passage 14 and discharges via the outlet 3.

As the degree of compression of the spring 17 changes, the raised position of the valve body 9 also changes and hence the fluid flow varies. The pressure is indicated by the pressure gauge disposed at the second side adjacent to the outlet 3. If the tank is filled with the fluid and the fluid pressure at the outlet 3 reaches the desired pressure, the operation of the adjusting screw 20 is stopped. Thus, if the pressure at the outlet 3 exceeds the predetermined pressure, the pressure receiving plate 12 is instantly pushed downward by the pressure until the valve closes and the tank maintains the predetermined pressure.

If any quantity of the fluid is removed from the tank through another outlet, the inner pressure of the tank reduces, and then the pressure receiving plate 12 rises again by the action of the spring 17 and the valve body 9 co-operates with the plate 12 to open the valve, whereby the fluid flows again into the second side. As shown in FIG. 3, the diameter $r_1$ of the upper portion 9a and the diameter $r_2$ of lower portion 9b of the valve body 9 is the same and this is true of the area $R_1$ covered by the bottom surface of the upper portion 9a and the area $R_2$ covered by the top surface of the lower portion 9b of the valve body. Accordingly, the pressure of the fluid at the neck portion 8 works equally to the valve body so that valve body 9 does not displace to keep the balance.

With the aforesaid structure and the mechanism, the automatic regulating valve of the present invention can assure a constant flow of the predetermined pressure and quantity to the secondary side without suffering from the effect of any change of the pressure in the first side. This valve device can also reopen the flow instantly and automatically whenever the pressure on the secondary side drops and continue the feeding until the pressure on the secondary reaches the predetermined pressure. As the valve body 9 and the pressure receiving plate 12 are formed as a unit, the valve is durable against any pressure and actuable sensitively to the back pressure and consequently the valve is less apt to explode.

Thus, it will be understood that the novel automatic regulating valve assures complete and safe operation and eliminates the defect that the change of the pressure is transmitted to the secondary side.

What is claimed is:

1. An automatic regulating valve for assuring a constant flow and a constant pressure comprising a valve casing having an inlet and an outlet, a valve opening in the casing, a valve body housed closely within the valve opening for movement within said opening, said valve body having a neck portion of lesser diameter than that of the body constituting a first pressure chamber located opposite to said inlet, said neck portion having upper and lower axially spaced portions which receive the same pressure respectively, a cap adjustably mounted in the valve casing closing the upper end of the valve opening, spring means biased between the cap and the upper end of the valve body, said cap and upper side of the valve opening providing a first free chamber receiving the flow from the inlet, said cap, spring means and valve body permitting adjustment at the outlet, said valve casing being provided with a second free chamber below the valve opening for passing the flow to the outlet, a pressure receiving plate at the lower end of the valve body housed closely within the second free chamber and capable of movement in said second free chamber, a spring-loaded adjustable screw means connected to the lower surface of the pressure receiving plate, a vertical passage in said valve body and a horizontal passage in said pressure receiving plate connecting the first free chamber and the second free chamber, and a stepped portion within the cap adapted to be connected to the neck portion to permit flow from the inlet into the first free chamber.

References Cited

UNITED STATES PATENTS

| 718,694 | 1/1903 | Chapman | 137—505.18 |
| 941,153 | 11/1909 | Krichbaum | 137—505.18 |
| 2,730,269 | 1/1956 | Earle | 137—505.18X |

FOREIGN PATENTS

| 331,654 | 8/1903 | France | 137—505.18 |

HAROLD W. WEAKLEY, Primary Examiner

U.S. Cl. X.R.

137—505.27, 505.42